US007920745B2

(12) United States Patent
Song et al.

(10) Patent No.: US 7,920,745 B2
(45) Date of Patent: *Apr. 5, 2011

(54) METHOD AND APPARATUS FOR PERFORMING CONSTRAINED SPECTRAL CLUSTERING OF DIGITAL IMAGE DATA

(75) Inventors: Yang Song, San Jose, CA (US); Thomas Leung, San Jose, CA (US)

(73) Assignee: Fujifilm Corporation, Tokyo (JP)

( * ) Notice: Subject to any disclaimer, the term of this patent is extended or adjusted under 35 U.S.C. 154(b) by 1284 days.

This patent is subject to a terminal disclaimer.

(21) Appl. No.: 11/393,875

(22) Filed: Mar. 31, 2006

(65) Prior Publication Data
US 2007/0239764 A1 Oct. 11, 2007

(51) Int. Cl.
*G06K 9/62* (2006.01)
(52) U.S. Cl. ........................................ 382/225; 707/737
(58) Field of Classification Search .................. 382/225; 707/737; 704/245
See application file for complete search history.

(56) References Cited

U.S. PATENT DOCUMENTS

| | | | |
|---|---|---|---|
| 5,550,928 A | 8/1996 | Lu et al. | |
| 5,771,307 A | 6/1998 | Lu et al. | |
| 5,802,494 A * | 9/1998 | Kuno | 705/2 |
| 6,246,412 B1 * | 6/2001 | Shum et al. | 345/419 |
| 6,546,185 B1 | 4/2003 | Kim et al. | |
| 6,801,640 B1 * | 10/2004 | Okubo et al. | 382/118 |
| 6,819,783 B2 | 11/2004 | Goldberg et al. | |
| 7,103,225 B2 | 9/2006 | Yang et al. | |
| 7,299,213 B2 * | 11/2007 | Cristianini | 706/12 |
| 7,519,200 B2 * | 4/2009 | Gokturk et al. | 382/118 |
| 2002/0046100 A1 | 4/2002 | Kinjo | |
| 2004/0234108 A1 | 11/2004 | Li et al. | |
| 2005/0260658 A1 | 11/2005 | Paladini et al. | |
| 2006/0018516 A1 * | 1/2006 | Masoud et al. | 382/115 |
| 2006/0120569 A1 * | 6/2006 | Kim et al. | 382/115 |
| 2006/0251292 A1 | 11/2006 | Gokturk et al. | |
| 2007/0237355 A1 * | 10/2007 | Song et al. | 382/100 |

OTHER PUBLICATIONS

Rapid Object Detection using a Boosted Cascade of Simple Features, Paul Viola et al., Accepted Conference on Computer Vision and Pattern Recognition, 2001.
Red Eye Detection with Machine Learning, Sergey Ioffe, In Proc. ICIP, 2003.
Constrained K-means Clustering with Background Knowledge, Kiri Wagstaff et al., Proceedings of the Eighteenth International Conference of Machine Learning, 2001, pp. 577-584.
On Spectral Clustering: Analysis and an algorithm, Andrew Y. Ng et al., In NIPS 14, 2002.

(Continued)

*Primary Examiner* — Brian P Werner
*Assistant Examiner* — Dennis Rosario
(74) *Attorney, Agent, or Firm* — Birch, Stewart, Kolasch & Birch, LLP

(57) ABSTRACT

A method and an apparatus process digital images. The method according to one embodiment accesses element data representing a plurality of elements belonging to a plurality of digital images; performs a similarity analysis between the elements from the plurality of elements to obtain inter-relational data results relating to the elements; and performs clustering of the plurality of elements, the step of performing clustering including incorporating in the inter-relational data results at least one hard constraint relating to elements from the plurality of elements, to obtain constrained inter-relational data results, performing a spectral analysis to obtain eigenvector results from the constrained inter-relational data results, and performing discretization of the eigenvector results using constrained clustering with a criterion to enforce the at least one hard constraint to obtain clusters.

40 Claims, 9 Drawing Sheets

OTHER PUBLICATIONS

Segmentation using eigenvectors: a unifying view, Yair Weiss, UC Berkeley, Berkeley, California, In Proc. ICCV, 1999.

Normalized Cuts and Image Segmentation, Jianbo Shi et al., In Proc. CVPR, IEEE, pp. 731-737, Jun. 1997.

Automated Annotation of Human Faces in Family Albums, Lei Zhang et al., In MM '03, Nov. 2-8, 2003.

Grouping with Bias, Stella X. Yu et al., Robotics Institute, Carnegie Mellon University, Pittsburgh, Pennsylvania, In NIPS, 2001.

Texton Correlation for Recognition, Thomas Leung, Fujifilm Software, San Jose, CA, In Proc. European Conference Computer Vision, 2004, pp. 203-214.

Hierarchical mixtures of experts and the EM algorithm, Michael I. Jordan et al., Neural Computation, 6:181-214, 1994.

A Statistical Method for 3D Object Detection Applied to Faces and Cars, Henry Schneiderman et al., In Proc. CVPR, 2000.

Video Google: A Text Retrieval Approach to Object Matching in Videos, Josef Sivic et al., Proceedings of the Ninth IEEE International Conference on Computer Vision, 2003.

Computational Models of Perceptual Organization, Stella X. Yu, Ph.d. Thesis, Carnegie Mellon University, Pittsburgh, Pennsylvania, May 2003, pp. 1-159.

* cited by examiner

METHOD AND APPARATUS FOR PERFORMING CONSTRAINED SPECTRAL CLUSTERING OF DIGITAL IMAGE DATA

CROSS REFERENCE TO RELATED APPLICATIONS

This non-provisional application is related to co-pending non-provisional applications titled "Method and Apparatus for Context-Aided Human Identification" and "Method and Apparatus for Adaptive Context-Aided Human Classification" filed concurrently herewith, the entire contents of which are hereby incorporated by reference.

BACKGROUND OF THE INVENTION

1. Field of the Invention

The present invention relates to a grouping technique, and more particularly to a method and apparatus for clustering digital images of objects, such as people.

2. Description of the Related Art

Identification and classification of objects in images is an important application useful in many fields. For example, identification and classification of people in images is important and useful for automatic organization and retrieval of images in photo albums, for security applications, etc. Face recognition has been used to identify people in photographs and in digital image data. Reliable face recognition and classification, however, is difficult to achieve because of variations in image conditions and human imaging, including lighting variations, pose changes, etc.

A technique for classification of images based on the identities of the people in images has been studied in "Automated Annotation of Human Faces in Family Albums", by L. Zhang, L. Chen, M. Li, and H. Zhang, in Proc. ACM Multimedia, MM'03, Berkeley, Calif., USA, Nov. 2-8, 2003. In this publication, facial features and contextual features are used to characterize people in images. However, in this publication, grouping of images based on identities of people cannot be done automatically, and only an image search is available.

K-means clustering algorithms and spectral clustering algorithms have been used to group objects into classes. Spectral clustering algorithms are described in "Normalized cuts and image segmentation", by J. Shi and J. Malik, in Proc. CVPR, pages 731-737, June 1997, "Segmentation using eigenvectors: a Unifying View", by Y. Weiss, in Proc. ICCV, 1999, and "On spectral clustering: Analysis and an algorithm", by A. Y. Ng, M. I. Jordan, and Y. Weiss, in NIPS 14, 2002. However, K-means clustering easily fails when object clusters do not correspond to convex regions, which is the case for human clustering when imaging conditions change due to variations, such as lighting changes and pose changes. While spectral clustering methods do not have this limitation, it is challenging to enforce context information such as hard constraints, in spectral clustering algorithms. Hard constraints, which provide information on whether two objects belong or not to the same cluster, provide important and useful cues for clustering of objects.

Disclosed embodiments of this application address issues associated with human recognition and classification, by using a constrained spectral clustering method and apparatus that can enforce hard constraints. The method and apparatus use a new clothes recognition algorithm and perform a principled integration of face and clothes recognition data. The constrained spectral clustering method and apparatus can enforce hard constraints such as logic-based constraints from context cues and user feedback.

SUMMARY OF THE INVENTION

The present invention is directed to a method and an apparatus that process digital images. According to a first aspect of the present invention, a digital image processing method comprises accessing element data representing a plurality of elements belonging to a plurality of digital images; performing a similarity analysis between the elements from the plurality of elements to obtain inter-relational data results relating to the elements; and performing clustering of the plurality of elements, the step of performing clustering including incorporating in the inter-relational data results at least one hard constraint relating to elements from the plurality of elements, to obtain constrained inter-relational data results, performing a spectral analysis to obtain eigenvector results from the constrained inter-relational data results, and performing discretization of the eigenvector results using constrained clustering with a criterion to enforce the at least one hard constraint to obtain clusters.

According to a second aspect of the present invention, a digital image processing method comprises accessing element data representing a plurality of elements belonging to a plurality of digital images; performing a similarity analysis between the elements from the plurality of elements to obtain inter-relational data results relating to the elements; and performing clustering of the plurality of elements, the step of performing clustering including incorporating in the inter-relational data results at least one hard negative constraint relating to dissimilarities between the elements, to obtain constrained inter-relational data results, performing a spectral analysis to obtain eigenvector results from the constrained inter-relational data results, and performing discretization of the eigenvector results by clustering the eigenvector results to obtain clusters.

According to a third aspect of the present invention, a digital image processing apparatus comprises: an image data unit for providing element data representing a plurality of elements belonging to a plurality of digital images; a similarity analysis unit for performing a similarity analysis between the elements from the plurality of elements to obtain inter-relational data results relating to the elements; and a clustering unit for performing clustering of the plurality of elements, the clustering unit performing clustering by incorporating in the inter-relational data results at least one hard constraint relating to elements from the plurality of elements, to obtain constrained inter-relational data results, performing a spectral analysis to obtain eigenvector results from the constrained inter-relational data results, and performing discretization of the eigenvector results using constrained clustering with a criterion to enforce the at least one hard constraint to obtain clusters.

According to a fourth aspect of the present invention, a digital image processing apparatus comprises: an image data unit for providing element data representing a plurality of elements belonging to a plurality of digital images; a similarity analysis unit for performing a similarity analysis between the elements from the plurality of elements to obtain inter-relational data results relating to the elements; and a clustering unit for performing clustering of the plurality of elements, the clustering unit performing clustering by incorporating in the inter-relational data results at least one hard negative constraint relating to dissimilarities between the elements, to obtain constrained inter-relational data results, performing a spectral analysis to obtain eigenvector results from the constrained inter-relational data results, and performing discretization of the eigenvector results by clustering the eigenvector results to obtain clusters.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
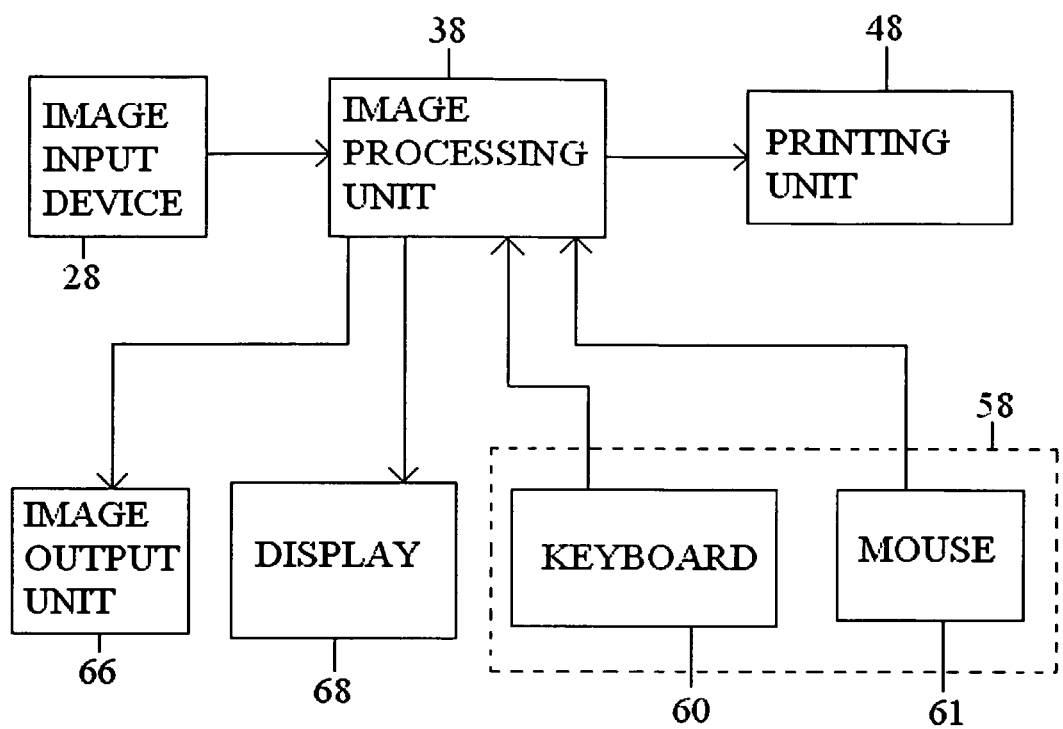
FIG. 1 is a general block diagram of a system including an image processing unit for performing constrained spectral clustering of digital image data according to an embodiment of the present invention.

Aspects of the invention are more specifically set forth in the accompanying description with reference to the appended figures. FIG. 1 is a general block diagram of a system including an image processing unit for performing constrained spectral clustering of digital image data according to an embodiment of the present invention. The system 108 illustrated in FIG. 1 includes the following components: an image input device 28; an image processing unit 38; a display 68; a user input unit 58; an image output unit 66; and a printing unit 48. Operation of the system 108 in FIG. 1 will become apparent from the following discussion.

The image input device 28 provides image data to image processing unit 38. Image data can be digital images. Examples of digital images that can be input by image input device 28 are photographs of people in everyday activities, photographs of people taken for security or identification purposes, etc. Image input device 28 may be one or more of any number of devices providing digital image data. Image input device 28 could provide digital image data derived from a database of images, a digital system, etc. Image input device 28 may be a scanner for scanning black and white or color images recorded on film; a digital camera; a recording medium such as a CD-R, a floppy disk, a USB drive, etc.; a database system which stores images; a network connection; an image processing system that outputs digital data, such as a computer application that processes images; etc.

The image processing unit 38 receives image data from the image input device 28, and performs constrained spectral clustering of digital image data, in a manner discussed in detail below. A user may view outputs of image processing unit 38, including intermediate results of constrained spectral clustering of digital image data, via display 68, and may input commands to the image processing unit 38 via the user input unit 58. In the embodiment illustrated in FIG. 1, the user input unit 58 includes a keyboard 60 and a mouse 61, but other conventional input devices could also be used.

In addition to performing constrained spectral clustering of digital image data in accordance with embodiments of the present invention, the image processing unit 38 may perform additional image processing functions, such as known color/density correction functions, as well as image cropping, compression, etc. in accordance with commands received from the user input unit 58. The printing unit 48 receives the output of the image processing unit 38 and generates a hard copy of the processed image data. The printing unit 48 may expose a light-sensitive material according to image data output by the image processing unit 38 to record an image on the light-sensitive material. The printing unit 48 may take on other forms, such as a color laser printer. In addition to or as an alternative to generating a hard copy of the output of the image processing unit 38, the processed image data may be returned to the user as a file, e.g., via a portable recording medium or via a network (not shown). The display 68 receives the output of the image processing unit 38 and displays image data together with clustering results for the image data. The output of the image processing unit 38 may also be sent to image output unit 66. Image output unit 66 can be a database that stores image clustering results received from image processing unit 38.

Figure 2:
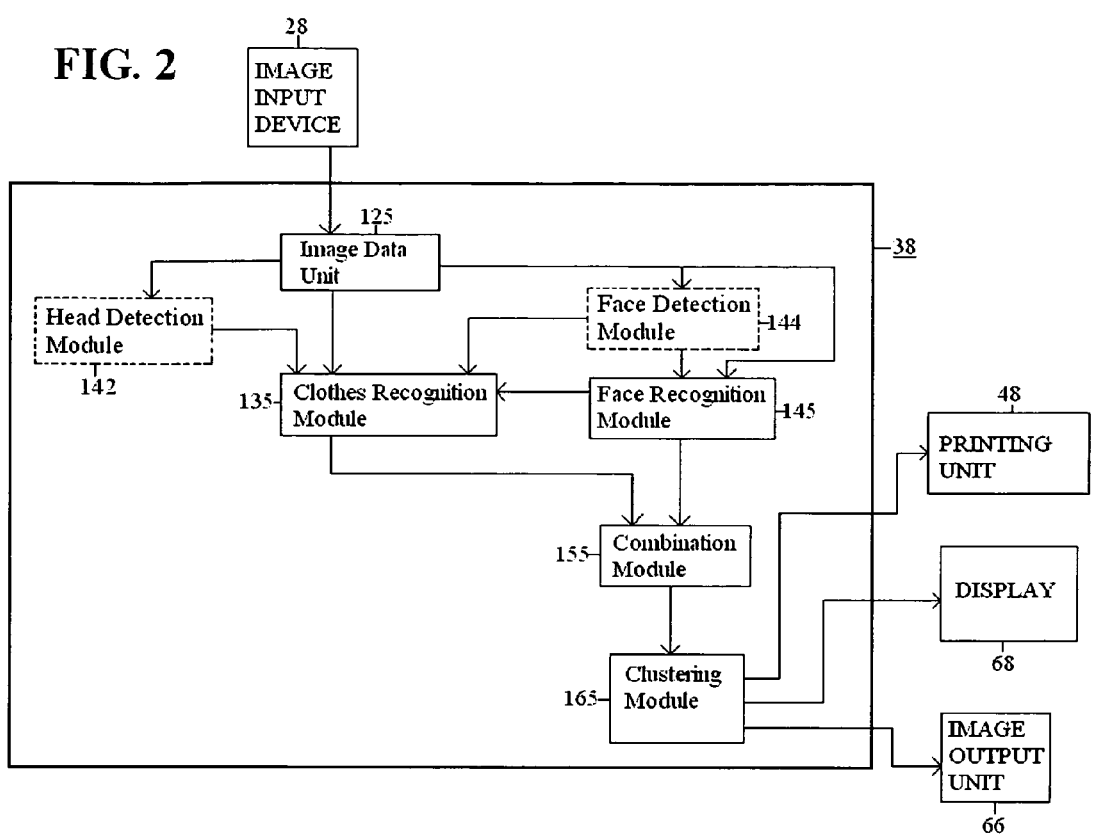
FIG. 2 is a block diagram illustrating in more detail aspects of an image processing unit for performing constrained spectral clustering of digital image data according to an embodiment of the present invention.

FIG. 2 is a block diagram illustrating in more detail aspects of an image processing unit 38 for performing constrained spectral clustering of digital image data according to an embodiment of the present invention. As shown in FIG. 2, image processing unit 38 according to this embodiment includes: an image data unit 125; a clothes recognition module 135; a face recognition module 145; a combination module 155; a clustering module 165; an optional face detection module 144; and an optional head detection module 142. Although the various components of FIG. 2 are illustrated as discrete elements, such an illustration is for ease of explanation and it should be recognized that certain operations of the various components may be performed by the same physical device, e.g., by one or more microprocessors.

Generally, the arrangement of elements for the image processing unit 38 illustrated in FIG. 2 inputs a set of images from image input device 28, performs recognition of clothes and faces in the images from the set of images, combines results of clothes and face recognition for the set of images, and uses constrained spectral clustering to cluster images according to identities of people shown in the images. Clustering module 165 outputs classification and identification results for images based on identities of people shown in the images. Such classification and identification results may be output to printing unit 48, display 68 and/or image output unit 66. Image data unit 125 may also perform preprocessing and preparation operations on images before sending them to clothes recognition module 135, face recognition module 145, optional face detection module 144, and optional head detection module 142. Preprocessing and preparation operations performed on images may include resizing, cropping, compression, color correction, etc., that change size, color, appearance of the images, etc.

Face detection determines locations and sizes of faces in a set of images. Face recognition determines the identities of detected faces with known locations and sizes. Hence, face recognition is typically performed after face detection. Face detection is performed by the optional face detection module 144, when the module is present. Face detection may also be performed by face recognition module 145, when the face recognition module 145 includes a sub-module for face detection. Hence, in this case, performing face recognition includes performing face detection. Clothes recognition module 135 may communicate with face recognition module 145 or with optional face detection module 144 to obtain results of face detection. Alternatively, clothes recognition module 135 may obtain results of head detection from optional head detection module 142.

Clothes recognition module 135, face recognition module 145, combination module 155, clustering module 165, face detection module 144, and head detection module 142 are software systems/applications in an exemplary implementation. Operation of the components included in the image processing unit 38 illustrated in FIG. 2 will be next described with reference to FIGS. 3-8.

Automatic organization of photographs is an important application with many potential uses such as photo album organization and security applications. Human clustering techniques that can organize pictures according to one or more persons' identities by using face information, clothes information, picture record data, and other context cues, are implemented in the current application. Through a clustering algorithm, persons in the pictures are placed into groups (clusters) based on the persons' identities. Hence all the images of the same individual are in one cluster, while images from other individuals are in other clusters.

A clustering method and apparatus that cluster images based on people's identities can use face recognition as well as other cues in images. Information besides faces (also called 'context' information in the current application) can provide rich cues for recognizing people. Three types of context information are typically present in images. The first type of context information is appearance-based, such as the clothes a person is wearing; the second type of context information is logic-based, and can be expressed, for example, by the fact that different faces in one picture belong to different persons, or by the fact that some people are more likely to be pictured together (e.g. husband and wife); the third type of context information is meta-data of pictures such as the picture-taken-time. These three types of context information are often used by human observers consciously or unconsciously to differentiate between people in pictures. A clustering method that can utilize context information effectively can improve human recognition accuracy.

The method and apparatus presented in this application automatically organize pictures according to persons' identities by using faces, as well as much context information as possible. Using the method described in the current application improves upon results from a face recognition engine using context information.

The phrases "person image", "people images", or "person images" are used interchangeably in the current application to refer to images of people inside an image. Hence, an image that shows three people contains three person images, while an image that shows one person contains one person image.

Figure 3:
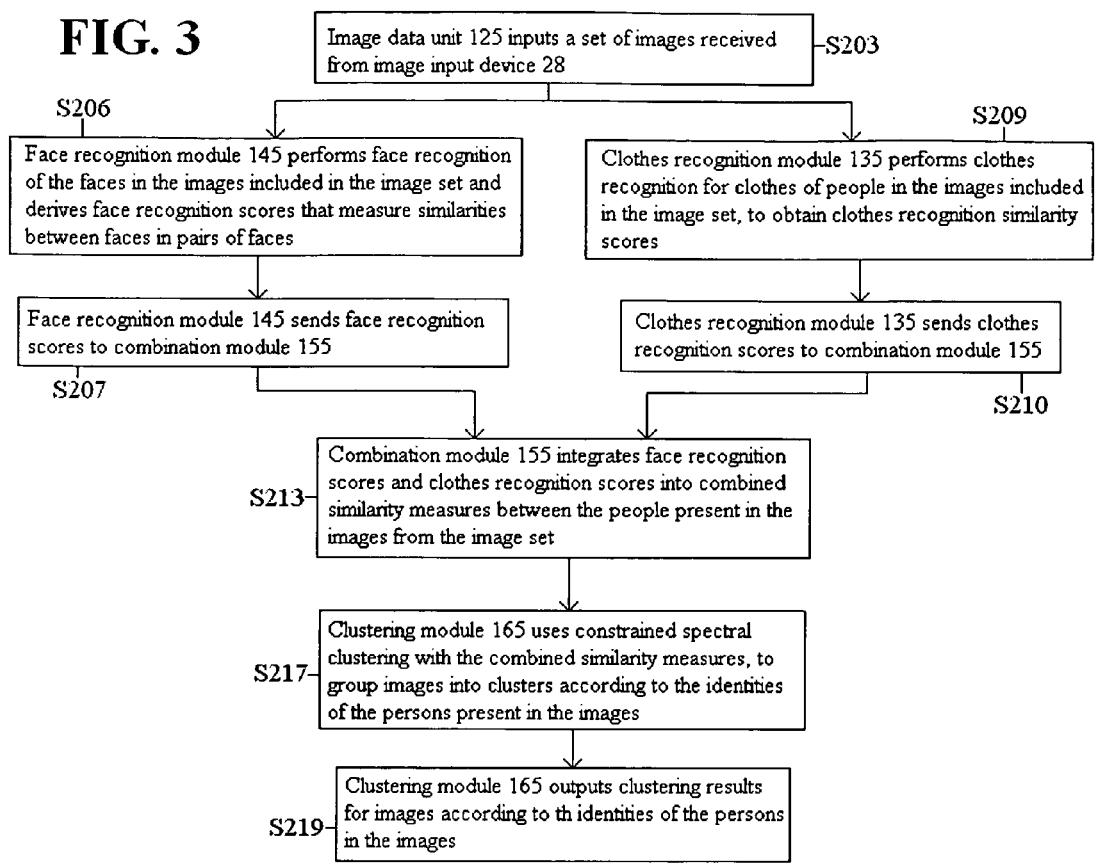
FIG. 3 is a flow diagram illustrating operations performed by an image processing unit for constrained spectral clustering of digital image data according to an embodiment of the present invention illustrated in FIG. 2.

FIG. 3 is a flow diagram illustrating operations performed by an image processing unit 38 for constrained spectral clustering of digital image data according to an embodiment of the present invention illustrated in FIG. 2. Image data unit 125 inputs a set of images received from image input device 28 (S203). The images may be pictures of people taken under different poses, at different times of day, in different days, and in different environments.

Face recognition module 145 receives the set of images and performs face recognition of the faces in the images included in the image set (S206). Face recognition is used to obtain face information that is associated with the identities of faces. Face recognition module 145 may derive a set of scores relating to face identities. Such scores may indicate correlations between two faces from the same or different images. If two faces from different images belong to the same person, the faces would exhibit a high correlation. On the other hand, if two faces from different images belong to different people, the faces would exhibit a low correlation. Face recognition module 145 may perform face recognition and obtain face recognition scores using methods described in the publication "Texton Correlation for Recognition", by T. Leung, in *Proc. European Conference Computer Vision*, ECCV 2004, pp. 203-214, which is herein incorporated by reference. In "Texton Correlation for Recognition" faces are represented using local characteristic features called textons, so that face appearance variations due to changing conditions are encoded by the correlations between the textons. Two methods can be used to model texton correlations. One method is a conditional texton distribution model and assumes locational independence. The second method uses Fisher linear discriminant analysis to obtain second order variations across locations. The texton models can be used for face recognition in images across wide ranges of illuminations, poses, and time. Face recognition module 145 derives face recognition scores that measure similarities between faces in face pairs (S206). Face recognition module 145 then outputs the face recognition scores to combination module 155 (S207). Other face recognition techniques may be used by face recognition module 145.

Clothes recognition module 135 receives the set of images from image data unit 125 as well, performs clothes recognition and obtains clothes recognition similarity scores for clothes of people in the images included in the image set (S209). Clothes, as referred to in the current invention, include actual clothes as well as other external objects associated with people in images. In the current application, the term "clothes" refers to actual clothes, as well as hats, shoes, watches, eyeglasses, etc., as all these objects can be useful in discriminating between different people. Clothes recognition module 135 outputs clothes recognition scores to combination module 155 (S210).

Clothes recognition scores measure the degree of similarity between clothes of different people. For example, when a person appears in two images wearing the same clothes, a score associated with the clothes of that person from the two different images indicates that the clothes are similar. Clothes recognition module 135 may perform clothes recognition to obtain clothes recognition scores using methods described in the cross-referenced related US application titled "Method and Apparatus for Context-Aided Human Identification", the entire contents of which are hereby incorporated by reference.

Combination module 155 receives face recognition scores from face recognition module 145 and clothes recognition scores from clothes recognition module 135. Combination module 155 then integrates face recognition scores and clothes recognition scores into combined similarity measures between the people present in the images (S213). Combined similarity measures integrating both face scores and clothes scores implement a more robust method for determining whether two people from different images are the same person or not. Linear logistic regression, Fisher linear discriminant analysis, or mixture of experts may be used to combine face and clothes recognition results and obtain combined similarity measures. A linear logistic regression method that combines face and clothes recognition results to obtain combined similarity measures may use techniques described in the cross-referenced related US application titled "Method and Apparatus for Adaptive Context-Aided Human Classification", the entire contents of which are hereby incorporated by reference.

Clustering module 165 receives combined similarity measures from combination module 155. Based on the combined similarity measures, clustering module 165 groups images into clusters according to the identities of the persons present in the images (S217). Clustering module 165 performs clustering of images using constrained spectral clustering. Clustering module 165 then outputs clustering results (S219). Such clustering results for images may be output to printing unit 48, display 68, and/or image output unit 66.

Figure 4:
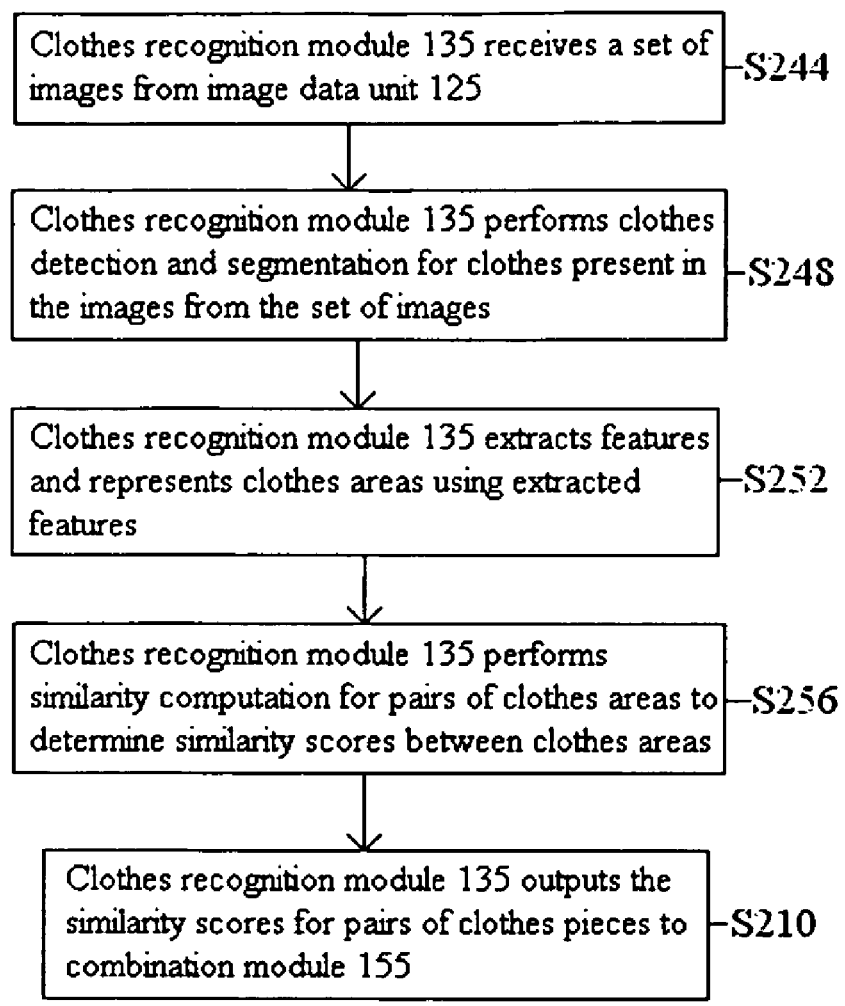
FIG. 4 is a flow diagram illustrating a technique for performing clothes recognition to obtain clothes recognition scores for clothes in digital image data according to an embodiment of the present invention.

FIG. 4 is a flow diagram illustrating a technique for performing clothes recognition to obtain clothes recognition scores for clothes in digital image data according to an embodiment of the present invention. The technique described in FIG. 4 may be used by clothes recognition module 135 to obtain similarity scores for clothes in images in step S209 of FIG. 3.

Clothes recognition identifies clothes pieces in images, determines how similar clothes pieces are to each other, and hence indicates how likely it is that two clothes pieces from two person images actually belong to the same individual. There are three major steps included in clothes recognition: clothes detection and segmentation, clothes representation by feature extraction, and similarity computation based on extracted features.

Clothes recognition module 135 receives a set of images from image data unit 125 (S244). Clothes recognition module 135 then performs detection and segmentation of clothes present in the images (S248). Clothes detection and segmentation includes an initial estimation of clothes location to detect initial clothes areas, segmentation of initial clothes areas in images to obtain refined clothes areas, and removal of clutters from the refined clothes areas. An initial estimation of clothes location is obtained from face detection, by using results of face detection from face recognition module 145, or from optional face detection module 144 if present. Face recognition module 145 and optional face detection module 144 may perform face detection using one or more of the methods described in the following publications which are herein incorporated by reference: "Red Eye Detection with Machine Learning", by S. Ioffe, in Proc. ICIP, 2003, "A Statistical Method for 3D Object Detection Applied to Faces and Cars", by H. Schneiderman and T. Kanade, in Proc. CVPR, 2000, and "Rapid Object Detection Using a Boosted Cascade of Simple Features", by P. Viola and M. Jones, in Proc. CVPR, 2001. An initial estimation of clothes location can also be obtained from head detection results from optional head detection module 142. Head detection may be performed using methods similar to the methods described in the above publications. Other methods may also be used for performing head detection.

Clutters represent image areas that are not actually part of clothes areas, but are mixed or intermixed with clothes areas. Clutters include skin areas, such as the skin of the people wearing the clothes, occluding objects such as an object located in front of a person and occluding part of the person's clothes, etc.

Clothes recognition module 135 next extracts features and represents clothes areas using the extracted features to obtain numerical representations for clothes areas (S252). The numerical representations of clothes areas generated by clothes recognition module 135 permit manipulation of the clothes areas for further analysis. Representative areas, or code-words, for clothes areas are extracted, and feature vectors are generated from frequencies of appearance of code-words in clothes areas. The feature vectors provide a numerical representation of clothes areas.

Clothes recognition module 135 finally performs a similarity computation, to determine similarity scores between clothes areas (S256). The similarity score of two pieces of clothes is computed as the normalized scalar product of the weighted code-word frequency vectors of the two pieces of clothes. Clothes recognition module 135 then outputs the similarity scores for pairs of clothes pieces to combination module 155 (S210). Additional details on how steps S248, S252, and S256 are performed can be found in the cross-referenced related US application titled "Method and Apparatus for Context-Aided Human Identification", the entire contents of which are hereby incorporated by reference.

Figure 5A:
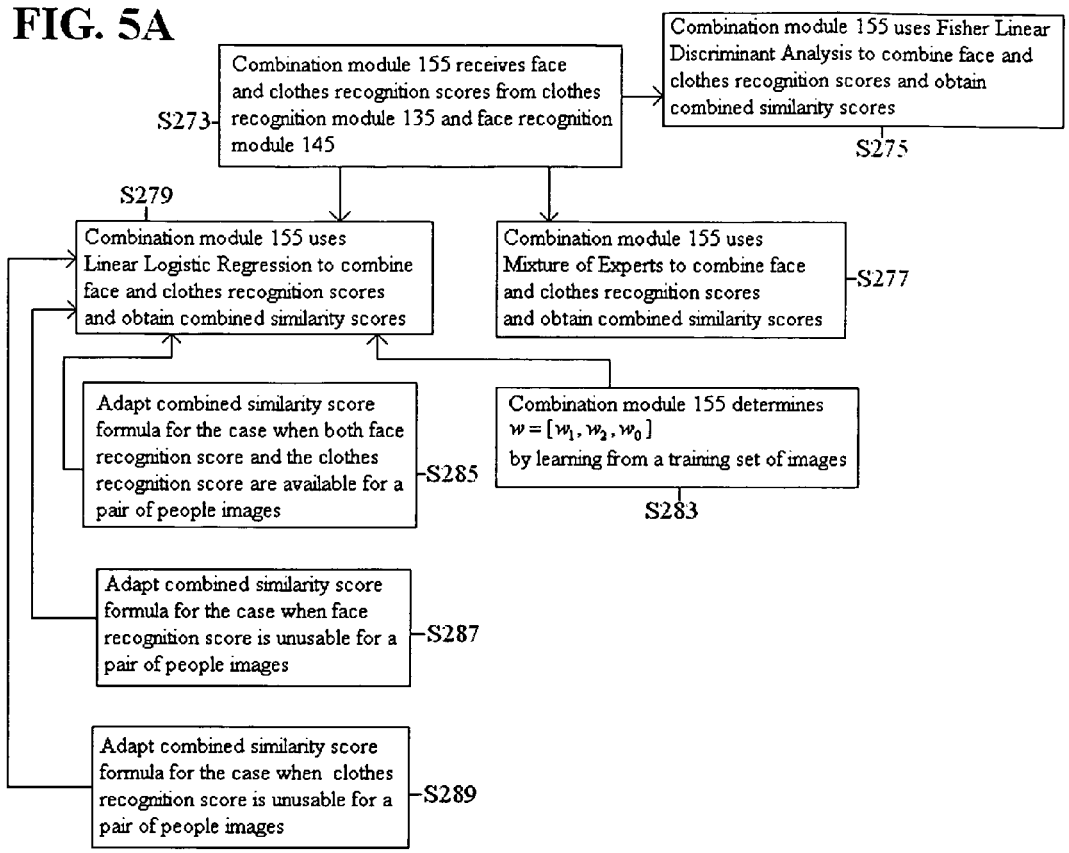
FIG. 5A is a diagram illustrating techniques for combining face and clothes recognition results to obtain combined similarity measures for person images according to an embodiment of the present invention.

FIG. 5A is a diagram illustrating techniques for combining face and clothes recognition results to obtain combined similarity measures for person images according to an embodiment of the present invention. The techniques described in FIG. 5A can be used by combination module 155 to obtain combined similarity measures for person images during operation step S213 of FIG. 3. Linear logistic regression, Fisher linear discriminant analysis, or mixture of experts may be used to combine face and clothes recognition results and obtain combined similarity measures.

Clothes information is complimentary to faces information and is very useful when the face position and angle changes as is the case with profile faces, when the quality of the face image is poor, or when facial expression variations occur in images. More powerful results for identity recognition of people in images are achieved when face and clothes cues are integrated, than when face cues alone are used.

Combination module 155 integrates clothes context with face context into similarity measures in the form of probability measures.

Mathematically, the cue combination problem can be described as follows. For any pair of images, let $x_1$ be the face recognition score from face recognition, and $x_2$ be the clothes recognition score from clothes recognition, measuring similarity between two persons that appear in images. Let random variable Y indicate whether the pair of persons is the same person or not. Hence, Y=1 means that the two persons represent the same person, and Y=0 means otherwise. The problem of cue combination can be solved by finding a function $f(x_1, x_2)$ such that the probability $$P(Y=1|x_1,x_2)=f(x_1,x_2) \qquad (1)$$

is a good indicator of whether the pair of person images represent the same person or not.

In the linear logistic regression method, the function $f$ is of the form:

$$P(Y=1\mid \bar{x}) = f(\bar{x}) = \frac{1}{1+\exp(-w\bar{x})} \qquad (2)$$

where $\bar{x}=[x_1,x_2,1]^T$, and $w=[w_1,w_2,w_0]$ is a 3-dimensional vector with parameters determined by learning from a training set of images (S283). The training set of images contains pairs of person images coming either from the same person or from different people. Face recognition scores and clothes recognition scores are extracted for the pairs of training images. The parameter w is determined as the parameter that can maximize the likelihood that the probability in equation (2) correctly describes when two people from training pairs are the same person, and when two people from the training pairs are not the same person. Details on how $w=[w_1,w_2,w_0]$ is determined from training images can be found in the cross-referenced related US application titled "Method and Apparatus for Adaptive Context-Aided Human Classification", the entire contents of which are hereby incorporated by reference.

After the learning process, the parameter w is determined and used in linear logistic regression for actual operation of the image processing unit 38 to obtain combined similarity measures between people in new images using face recognition and clothes recognition scores from new images (S279). For a pair of persons in images, the combined similarity measure P(Y=1) is obtained by introducing the face recognition scores and clothes recognition scores from the pair of person images into equation (2) (S285). P(Y=1) is the probability that the pair of persons actually represents the same person. The formula for calculating the probability P(Y=1) can be adapted accordingly for the case when either the face recognition score or the clothes recognition score is unusable or missing for a pair of person images (S287, S289). A detailed description of the linear logistic regression method and formula selection/adaptation method is found in the cross-referenced related US application titled "Method and Apparatus for Adaptive Context-Aided Human Classification", the entire contents of which are hereby incorporated by reference.

Fisher linear discriminant analysis can also be used by combination module 155 to combine face and clothes recognition results and obtain combined similarity measures (S275). Fisher's discriminant analysis provides a criterion to find the coefficients that can best separate the positive examples (image pairs from the same person) and negative examples (pairs from different persons). The scores from face recognition and clothes recognition can be combined linearly using the linear coefficients learned via Fisher's linear discriminant analysis.

The mixture of experts is a third method that can be used by combination module 155 to combine face and clothes recognition results and obtain combined similarity measures (S277). The linear logistic regression method and the Fisher linear discriminant analysis method are essentially linear, and the combination coefficients are the same for the whole space. Mixture of experts provides a way to divide the whole space and combine similarity measures accordingly. The mixture of experts method is a combination of several experts, with each expert being a logistic regression unit. Combination module 155 may use the mixture of experts method described in "Hierarchical Mixtures of Experts and the EM Algorithm", by M. I. Jordan and R. A. Jacobs, Neural Computation, 6: pp. 181-214, 1994, which is herein incorporated by reference.

Figure 5B:
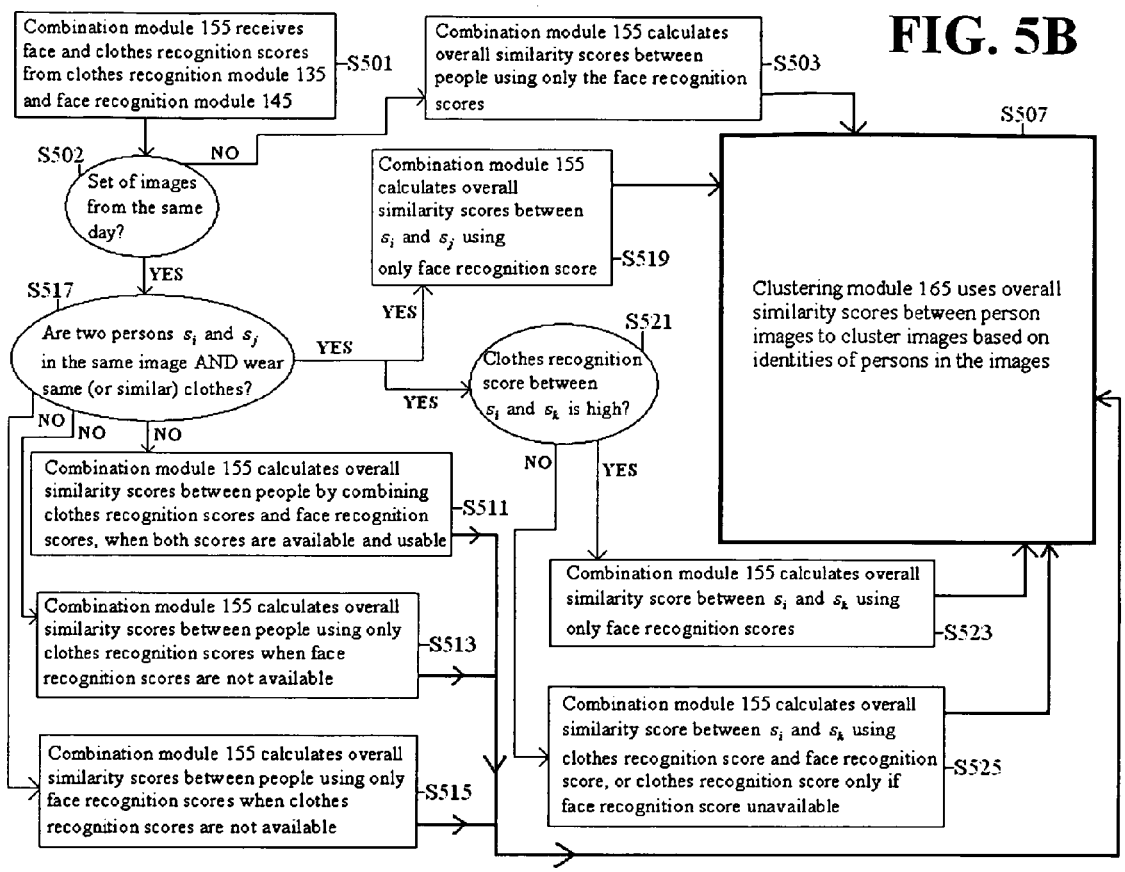
FIG. 5B is a flow diagram illustrating a technique for determining similarity measures for person images based on availability of face and clothes similarity scores according to an embodiment of the present invention.

FIG. 5B is a flow diagram illustrating a technique for determining similarity measures for person images based on availability of face and clothes similarity scores according to an embodiment of the present invention. The technique in FIG. 5B can be used by combination module 155 to determine similarity scores between people in images.

Suppose combination module 155 receives face and clothes recognition scores from clothes recognition module 135 and face recognition module 145 (S501). The face and clothes recognition scores are extracted for person images present in a set of images. Combination module 155 determines if the images from the set of images are from the same event (the same day) or not, by verifying the picture-taken-times of images or other implicit time or location information of images in the set of images (S502). Clothes provide an important cue for recognizing people in the same event (or on the same day) when clothes are not changed. If the images from the set of images are not from the same event and day, then combination module 155 calculates combined similarity measures, also called overall similarity scores herein, between people using only the face recognition scores (S503). Combination module 155 then sends the overall similarity scores to clustering module 165.

If the images from the set of images are from the same day/event, then combination module 155 calculates overall similarity scores between people by combining both clothes recognition scores and face recognition scores, when both scores are available and usable (S511). If face recognition scores are not available for some pairs of person images, which could be the case when faces in images are profile faces or are occluded, combination module 155 calculates overall similarity scores between people using only clothes recognition scores (S513). If clothes recognition scores are not available for some pairs of person images, which could be the case when clothes are occluded in the images, combination module 155 calculates overall similarity scores between people using only face recognition scores (S515). Combination module 155 sends the overall similarity scores to clustering module 165.

A special case occurs when two people in an image wear the same (or similar) clothes. People wearing the same (or similar) clothes represents a difficult case for incorporating clothes information. Two persons in one picture usually are not the same individual. Therefore if in one picture, two persons $s_i$ and $s_j$ wear the same (or similar) clothes (S517), the clothes information needs to be discarded. Hence, when $s_i$ and $s_j$ from the same image have a high clothes similarity score, clustering module 165 treats the clothes similarity score as missing, and uses only the face similarity score to compute the overall similarity score between $s_i$ and $s_j$ (S519).

Moreover, if the clothes similarity score between $s_i$ and a third person $s_k$ ($s_k \neq s_j$) is high (S521), that is, the clothes of $s_k$ are very similar to the clothes of $s_i$ (and hence, also to the clothes of $s_j$), then the clothes similarity score for $s_i$ and $s_k$ is also treated as missing when calculating the overall similarity score (S523). In the same manner, if the clothes similarity score between $s_j$ and a third person $s_k$ ($s_k \neq s_i$) is high, that is the clothes of $s_k$ are very similar to the clothes of $s_j$ (and hence, also to the clothes of $s_i$), then the clothes similarity score for $s_j$ and $s_k$ is also treated as missing when calculating the overall similarity score.

However, if the pair-wise clothes similarity between $s_i$ and another person image $s_k$ ($s_k \neq s_j$) located in any image from the set of images is not high, the clothes recognition score between $s_i$ and $s_k$ can be used when calculating the overall similarity score, together with the face recognition score if available (S525). Similarly, if the pair-wise clothes similarity between $s_j$ and another person image $s_k$ ($s_k \neq s_i$) located in any image from the set of images is not high, the clothes recognition score between $s_j$ and $s_k$ can be used when calculating the overall similarity score, together with the face recognition score if available.

Clustering module 165 receives all overall similarity scores and uses the scores to cluster images based on identities of persons in the images (S507).

Figure 6:
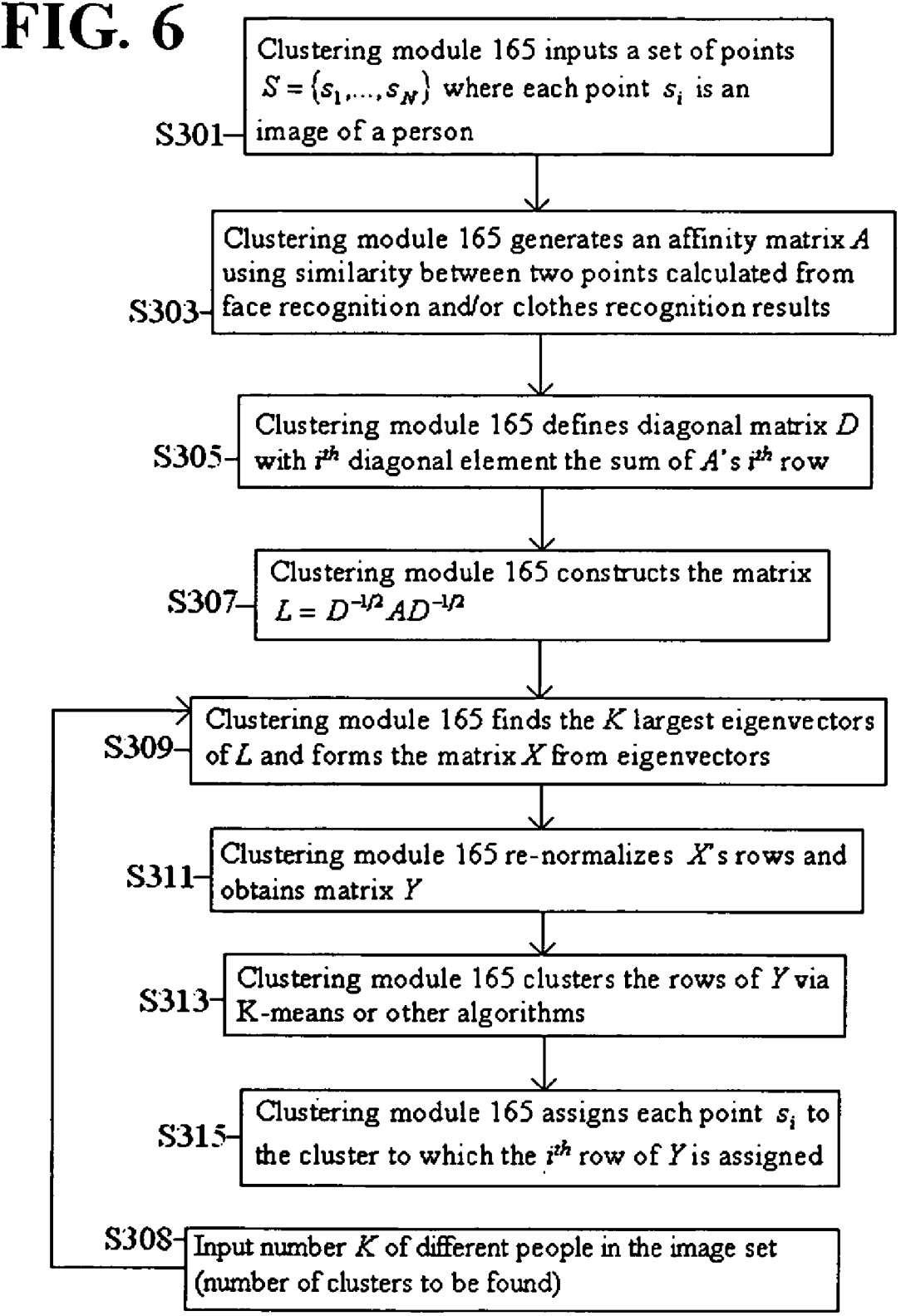
FIG. 6 is a flow diagram illustrating a technique for performing spectral clustering of person images according to an embodiment of the present invention.

FIG. 6 is a flow diagram illustrating a technique for performing spectral clustering of person images according to an embodiment of the present invention. The technique in FIG. 6 can be used by clustering module 165 to cluster images based on the identities of the people in the images. The pair-wise probability similarity measurements (overall similarity scores) obtained by combination module 155 provide grounds for clustering of people from images based on their identity, and hence, for clustering images according to the identities of the people shown in them.

Many clustering algorithms have been developed, from traditional K-means methods to the recent spectral clustering methods as described in "Normalized cuts and image segmentation", by J. Shi and J. Malik, in *Proc. CVPR*, pages 731-737, June 1997, "Segmentation using eigenvectors: a Unifying View", by Y. Weiss, in *Proc. ICCV*, 1999, "On spectral clustering: Analysis and an algorithm", by A. Y. Ng, M. I. Jordan, and Y. Weiss, in *NIPS* 14, 2002, and *Computational Models of Perceptual Organization*, by Stella X. Yu, Ph.D. Thesis, Carnegie Mellon University, 2003, CMU-RI-TR-03-14. One major advantage of spectral clustering methods over K-means methods is that K-means methods can easily fail when clusters do not correspond to convex regions. The same is the case for mixture of models using EM, which often assume that the density of each cluster is Gaussian. In human clustering, imaging conditions can change in various aspects, leading to cluster that do not necessarily form a convex region. Therefore a spectral clustering algorithm is favored for human clustering in the present application.

Spectral clustering methods cluster points by eigenvalues and eigenvectors of a matrix derived from the pair-wise similarities between points. Spectral clustering methods do not assume global structures, so these methods can handle non-convex clusters. Spectral clustering is similar to graph partitioning: each point is a node in the graph and similarity between two points gives the weight of the edge between those points. In human clustering, each point is a person's image, and similarity measurements are probabilities of same identity derived from face and/or clothes recognition scores.

One effective spectral clustering method used in computer vision is the method of normalized cuts, as described in "Normalized Cuts and Image Segmentation", by J. Shi and J. Malik, in *Proc. CVPR*, pages 731-737, June 1997, which is herein incorporated by reference. The normalized cuts method from the above publication is generalized in "Computational Models of Perceptual Organization", by Stella X. Yu, Ph.D. Thesis, Carnegie Mellon University, 2003, CMU-RI-TR-03-14, which is herein incorporated by reference.

The normalized cuts criterion maximizes links (similarities) within each cluster and minimizes links between clusters. Suppose a set of points $S=\{s_1, \ldots, s_N\}$ is to be clustered into K clusters. Let W be the N×N weight matrix, with term $W_{ij}$ being the similarity between points $s_i$ and $s_j$. Let D denote the diagonal matrix with the $i^{th}$ diagonal element being the sum of W's $i^{th}$ row (i.e. the degree for the $i^{th}$ node). The clustering results can be represented by a N×K partition matrix X, with $X_{ik}=1$ if and only if point $s_i$ belongs to the $k^{th}$ cluster, and 0 otherwise. Let $X_l$ denote the $l^{th}$ column vector of X, $1 \leq l \leq K$. $X_l$ is the membership indicator vector for the $l^{th}$ cluster. Using these notations, the normalized cut criterion finds the best partition matrix X* which can maximize $$\varepsilon(X) = \frac{1}{K}\sum_{l=1}^{K} \frac{X_l^T W X_l}{X_l^T D X_l} \quad (3)$$

Relaxing the binary partition matrix constraint on X and using Rayleigh-Ritz theorem, it can be shown that the optimal solution in the continuous domain is derived through the K largest eigenvectors of $D^{-1/2}WD^{-1/2}$. Let $v_i$ be the $i^{th}$ largest eigenvector of $D^{-1/2}WD^{-1/2}$, and $V^K=[v_1, v_2, \ldots, v_K]$ Then the continuous optimum of $\varepsilon(X)$ can be achieved by $X^*_{conti}$, the row normalized version of $V^K$ (each row of $X^*_{conti}$ has unit length). In fact, the optimal solution is not unique—the optima are a set of matrices up to an orthonormal transformation: $\{X^*_{conti}O:O^T O=I_K\}$ where $I_K$ is the K×K identity matrix.

Hence, for the operation of image processing unit 38, suppose a set of points $S=\{s_1, \ldots, s_N\}$ is input into clustering module 165, where each point $s_i$ for $1 \leq i \leq N$ is an image of a person (may include face or clothes or both) from the images from the set of images (S301). Thus, if image I1 shows 3 people, image I1 contributes with $s_1$, $s_2$ and $s_3$ to the set S. If image I2 shows 2 people, image I2 contributes with $s_4$ and $s_5$ to the set S. And so on. The points $s_1, s_2, \ldots, s_N$ are to be clustered into K clusters, with each cluster corresponding to one identity among K identities of people found in the images.

The similarity between two points can be computed from face recognition and/or clothes recognition results by combination module 155. The spectral clustering method described in "On spectral clustering: Analysis and an Algorithm", by A. Y. Ng, M. I. Jordan, and Y. Weiss, *NIPS* 14, 2002, which is herein incorporated by reference, is followed. Using similarity measurements between points (person images), an N by N affinity matrix A is formed, with each term $A_{ij}$ being the similarity score between $s_i$ and $s_j$ for $i \neq j$, and $A_{ii}=0$ for the diagonal terms (S303). Clustering module 165 then defines D as the diagonal matrix whose $i^{th}$ diagonal element is the sum of A's $i^{th}$ row (S305). Clustering module 165 then constructs the matrix $L=D^{-1/2}AD^{-1/2}$ (S307), finds the K largest eigenvectors of L, and forms the matrix X by stacking these eigenvectors in columns (S309).

The number K of different people in the image set is input into clustering module 165 (S308) before clustering module 165 selects the K largest eigenvectors. The number of different people in the image set is the number of clusters to be found. The number of different people, or clusters, in the image set may be determined in a number of ways. The number of different people in the image set can be manually input into clustering module 165 by a user using the user input unit 58. The number of different people in the image set can also be found using the eigenvalues of the L matrix. The largest eigenvalue of L is one, and all the eigenvalues are non-negative. The eigenvalues are sorted in decreasing order, so that $1=\lambda_1 \geq \lambda_2 \geq \ldots \geq \lambda_N \geq 0$. If the value change from $\lambda_i$ to $\lambda_{i+1}$ is large, then i can be a good choice for the number of clusters K. The number of different people (clusters) in the image set can also be found by selecting the number of clusters according to the sum of distance from points to their centers in K-means clustering. A few values for the number of clusters K can be tested. K is picked as the number of clusters with the smallest sum of distances from points to their centers, after performing normalization for different dimensions considered in the calculation of distances.

Clustering module 165 then forms the matrix Y by re-normalizing each of X's rows to have unit length (S311). Treating each row of Y as a point, clustering module 165 clusters the rows of Y via K-means or other algorithms (S313). Finally, clustering module 165 assigns each point $s_i$ to cluster j if the $i^{th}$ row of Y is assigned to cluster j (S315).

The set of eigenvalues of a matrix is called its spectrum. The algorithm shown in FIG. 6 makes use of the eigenvalues and eigenvectors of the data's affinity matrix, so it is a spectral clustering algorithm. The algorithm essentially transforms the data to a new space so that data are better clustered in the new space.

Figure 7:
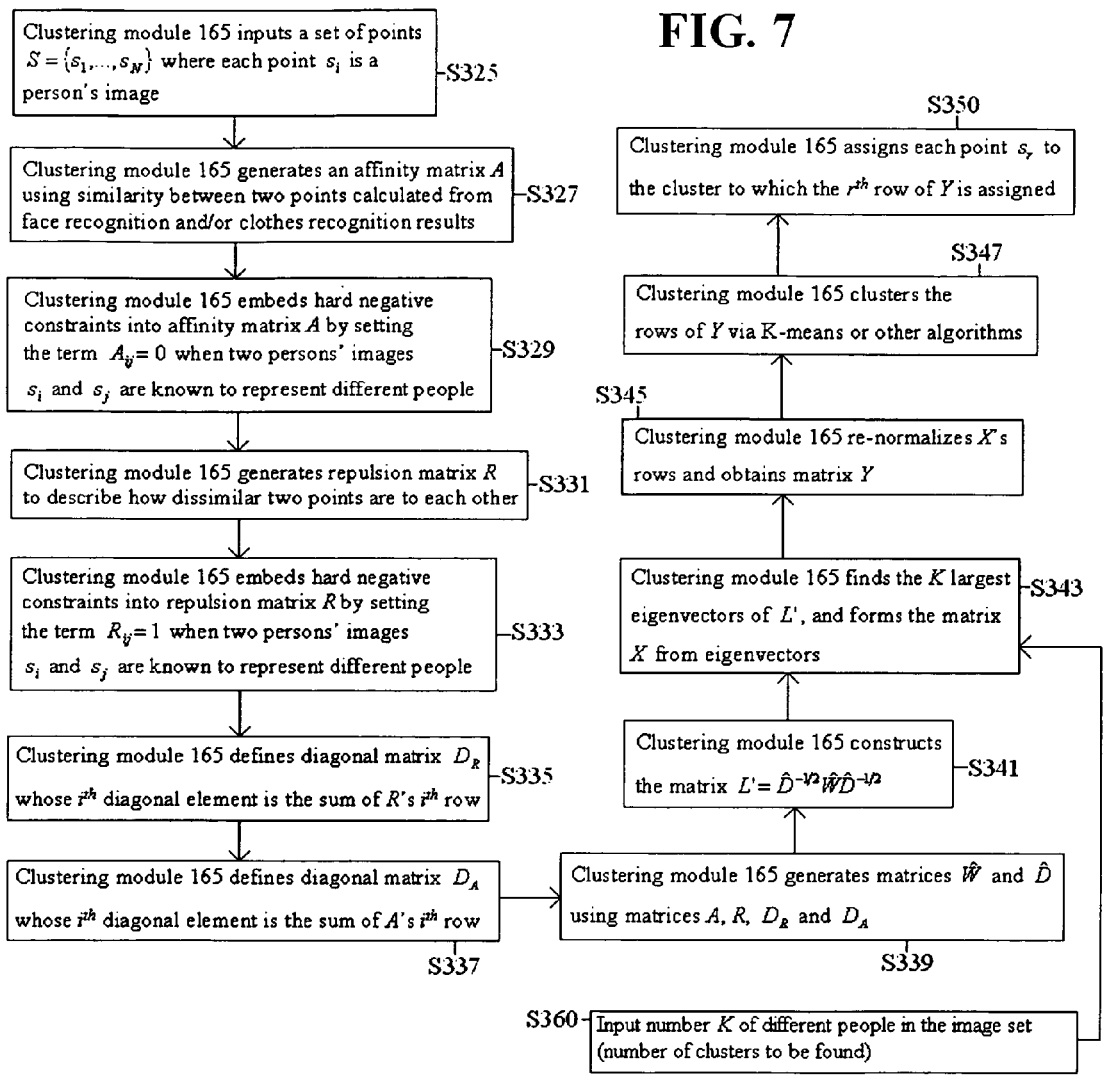
FIG. 7 is a flow diagram illustrating a technique for performing spectral clustering of person images using a repulsion matrix with hard constraints according to an embodiment of the present invention.

FIG. 7 is a flow diagram illustrating a technique for performing spectral clustering of person images using a repulsion matrix with hard constraints according to an embodiment of the present invention. The technique in FIG. 7 can be used by clustering module 165 to cluster images based on the identities of the people in the images.

In the publication "Computational Models of Perceptual Organization", by Stella X. Yu, Ph.D. Thesis, Carnegie Mellon University, 2003, CMU-RI-TR-03-14, which is herein incorporated by reference, a repulsion matrix is introduced to model the dissimilarities between points. The clustering goal becomes to maximize within-cluster similarities and between cluster dissimilarities, but to minimize their compliments. Suppose a set of points $S=\{s_1, \ldots, s_N\}$ needs to be clustered into K clusters, where each point $s_k$ is an image of a person. Let A be the matrix quantifying similarities (affinity matrix), R be the matrix representing dissimilarities (repulsion matrix), and $D_A$ and $D_R$ be the diagonal matrices corresponding to the row sum of A and R respectively. Define $$\hat{W}=A-R+D_R \quad (4)$$

and $$\hat{D}=D_A+D_R \quad (5)$$

The goal is then to find the partition matrix X that can maximize:

$$\frac{1}{K}\sum_{l=1}^{K} \frac{X_l^T \hat{W} X_l}{X_l^T \hat{D} X_l}. \quad (6)$$

The continuous optima can be found through the K largest eigenvectors of $\hat{D}^{-1/2}\hat{W}\hat{D}^{-1/2}$ in a fashion similar to the case without a repulsion matrix.

Since a continuous solution can be found by solving eigensystems, the above method using an affinity matrix and a repulsion matrix is fast and can achieve a global optimum in the continuous domain. However, for clustering, a continuous solution needs to be discretized. In "Computational Models of Perceptual Organization", by Stella X. Yu, Ph.D. Thesis, Carnegie Mellon University, 2003, CMU-RI-TR-03-14, discretization is done iteratively to find the binary partition matrix $X^*_{discrete}$ which can minimize $\|X_{discrete}-X^*_{conti}O\|^2$, where $\|M\|$ is the Frobenius norm of matrix M: $\|M\|=\sqrt{tr(MM^T)}$, O is any orthonormal matrix, and $X^*_{conti}O$ is a continuous optimum.

The goal of clustering module 165 is to cluster pictures according to each person's identity utilizing as much context information as possible. Similarity computation between two points (two person images) is important in the clustering process. Besides faces and clothes in images, there may exist additional cues that can be incorporated and utilized to improve human recognition. Logic-based constraints represent additional cues that can help in clustering people in images based in identities. Such cues could be hard constraints. Logic-based context and constraints represent knowledge that can be obtained from common logics, such as the constraint that different faces in one picture belong to different individuals, or the constraint that husband and wife are more likely to be pictured together. Some logic-based constraints are hard constraints. For example, the constraint that different faces in one picture belong to different individuals is a negative hard constraint. Other logic-based constraints are soft constraints, such as the constraint that husband and wife are more likely to be pictured together. Another useful positive soft constraint is prior knowledge that a person is present in a group of images.

Hence, the constraint that a face must belong to person A is a hard constraint. On the other hand, the fact that the probability of a face belonging to person A is 0.8, is a soft constraint. Clustering module 165 can improve human clustering results by using more context cues through incorporation into the clustering method of logic-based contexts that can be expressed as hard constraints. To make use of logic constraints, the clustering approach described in FIG. 6 is modified by using a repulsion matrix.

It is desirable to be able to enforce such hard constraints in human clustering. However, incorporating priors (such as hard constraints) poses a challenge for spectral clustering algorithms. In "Computational Models of Perceptual Organization", by Stella X. Yu, Ph.D. Thesis, Carnegie Mellon University, 2003, CMU-RI-TR-03-14, and "Grouping with Bias", by S. X. Yu and J. Shi, in *NIPS*, 2001, a method to impose positive constraints (two points must belong to the same cluster) was proposed, but there is no guarantee that the positive constraints will be respected as the constraints may be violated in the discretization step.

The human clustering method in FIG. 7 in the current application seeks to enforce hard constraints, negative as well as positive.

Using the notations introduced for the clustering methods described by equations (4), (5) and (6), let $S=\{s_1, \ldots, s_N\}$ be the set of points associated with person images from all the images from the set of images (S325). The points $s_1, s_2, \ldots, s_N$ are to be to be clustered into K clusters, with each cluster corresponding to one identity among all K identities of people found in the images. The pair-wise similarity between two points $s_i$ and $s_j$ is obtained from face and/or clothes recognition scores and other context cues. The similarity values for pairs of people' images were calculated by combination module 155 as probabilities for pairs of people to represent the same person. Using the similarity measurements associated with pairs of person images, clustering module 165 forms an N by N affinity matrix A, with each term $A_{ij}$ being the probability similarity score between $s_i$ and $s_j$ for $i \neq j$, and $A_{ij}=0$ for i=j, that is $A_{ii}=0$ for the diagonal terms of matrix A (S327).

Suppose $s_i$ and $s_j$ are two person images that are found in the same picture. In this case, the two persons are typically different people (have different identities), so the clustering module 165 should place $s_i$ and $s_j$ in different clusters. To embed this constraint, the term $A_{ij}$ in the affinity matrix A corresponding to the similarity between $s_i$ and $s_j$ is set to zero, $A_{ij}=0$ (S329).

To enhance hard negative constraints, a repulsion matrix R is generated, to describe how dissimilar the two points $s_i$ and $s_j$ are (S331). If $s_i$ and $s_j$ are two person images that are found in the same picture and therefore represent different people, the term $R_{ij}$ is set to be 1. More generally, the term $R_{ij}$ is set to be 1 if $s_i$ and $s_j$ cannot be in the same cluster (S333). If there are no known constraints between two points $s_i$ and $s_j$, then the corresponding term $R_{ij}$ is set to be zero.

Let $D_R$ be the diagonal matrix whose $i^{th}$ diagonal element is the sum of R's $i^{th}$ row (S335), and $D_A$ to be the diagonal matrix whose $i^{th}$ diagonal element is the sum of A's $i^{th}$ row (S337). Matrices $\hat{W}$ and $\hat{D}$ are defined as in equations (4) and (5), by $\hat{W}=A-R+D_R$ and $\hat{D}=D_A+D_R$ (S339). The L matrix is then defined as (S341):

$$L'=\hat{D}^{-1/2}\hat{W}\hat{D}^{-1/2} \tag{7}$$

Clustering module 165 then finds the K largest eigenvectors of L', and forms the matrix X by stacking these eigenvectors in columns (S343).

The number K of different people in the image set is input into clustering module 165 (S360) before clustering module 165 selects the K largest eigenvectors. The number of different people in the image set is the number of clusters to be found. The number of different people, or clusters, in the image set may be determined in a number of ways. The number of different people in the image set can be manually input into clustering module 165 by a user using the user input unit 58. The number of different people in the image set can also be found as described at FIG. 6, using the eigenvalues of the matrix $L_0=D^{-1/2}AD^{-1/2}$ constructed as in FIG. 6. The number of different people (clusters) in the image set can also be found by selecting the number of clusters according to the sum of distances from points to their centers in K-means clustering as described for FIG. 6.

Clustering module 165 then forms the matrix Y by renormalizing each of X's rows to have unit length (S345). Treating each row of Y as a point, clustering module 165 clusters the rows of Y via K-means or other algorithms (S347). Finally, clustering module 165 assigns each point $s_i$ to cluster j if the $i^{th}$ row of Y is assigned to cluster j (S350).

Figure 8:
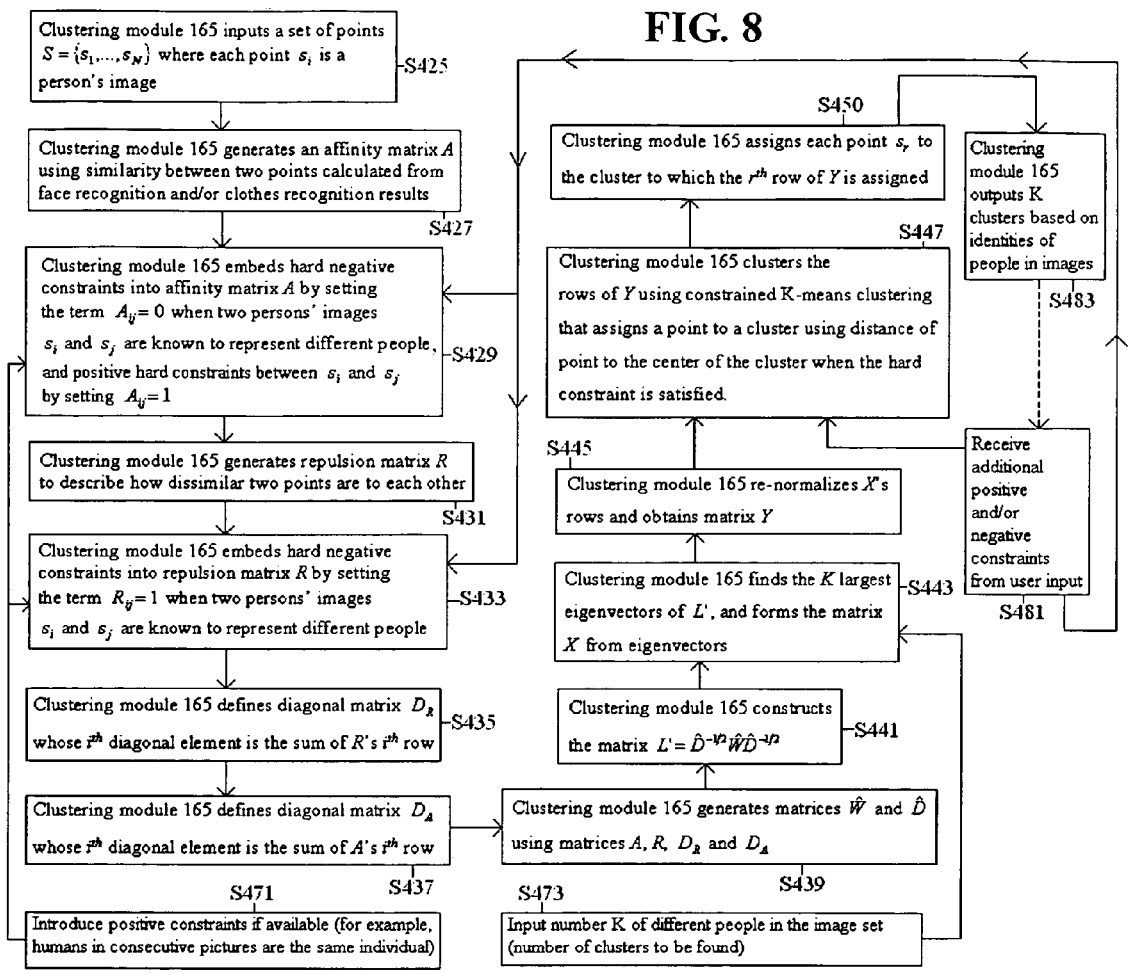
FIG. 8 is a flow diagram illustrating a technique for performing spectral clustering with constrained K-means clustering of person images to enforce hard constraints according to an embodiment of the present invention.

FIG. 8 is a flow diagram illustrating a technique for performing spectral clustering with constrained K-means clustering of person images to enforce hard constraints according to an embodiment of the present invention. The technique in FIG. 8 can be used by clustering module 165 enforce hard constraints, for clustering images based on the identities of the people in the images.

Although spectral clustering methods are more advantageous to K-means methods because K-means methods can easily fail when clusters do not correspond to convex regions, it is difficult to enforce hard constraints in spectral clustering methods. Introducing hard constraints in the affinity matrix A and in the repulsion matrix R may not be enough for enforcing these constraints, because there is no guarantee that the hard constraints are satisfied during the clustering step. Constrained K-means clustering is performed to ensure that the hard constraints are satisfied.

A constrained K-means algorithm that integrates hard constraints into K-means clustering is presented in "Constrained K-Means Clustering with Background Knowledge", by K. Wagstaff, C. Cardie, S. Rogers, and S. Schroedl, in *Proc. 18th International Conference on Machine Learning ICML,* 2001, pp. 577-584, which is herein incorporated by reference. In the publication "On Spectral Clustering: Analysis and an Algorithm", by A. Y. Ng, M. I. Jordan, and Y. Weiss, in *NIPS 14,* 2002, which is herein incorporated by reference, K-means was used in the discretization step. However, in this publication, a repulsion matrix was not used, the use of K-means with a repulsion matrix was not justified, the regular K-means instead of constrained K-means was used, and therefore no constraints were imposed.

In the current application, a constrained K-means algorithm is implemented in the discretization step to enforce hard constraints for human clustering in images. The constrained K-means algorithm may use methods described in publication "Contrained K-Means Clustering with Background Knowledge", by K. Wagstaff, C. Cardie, S. Rogers, and S. Schroedl, in *Proc. 18th International Conference on Machine Learning ICML,* 2001, pp. 577-584, which is herein incorporated by reference.

Let $S=\{s_1, \ldots, s_N\}$ be the set of points associated with person images from all the images from the set of images (S425). The points $s_1, s_2, \ldots, s_N$ are to be to be clustered into K clusters, with each cluster corresponding to one identity among all K identities of people found in the images. As before, the pair-wise similarity between two points $s_i$ and $s_j$ is obtained from face and/or clothes recognition scores and other context cues. The similarity values for pairs of person images were calculated by combination module 155 as probabilities for pairs of people to represent the same person. Using the similarity measurements associated with pairs of person images, clustering module 165 forms an N by N affinity matrix A, with each term $A_{ij}$ being the probability similarity score between $s_i$ and $s_j$ for $i \neq j$, and $A_{ij}=0$ for $i=j$, that is $A_{ii}=0$ for the diagonal terms of matrix A (S427).

Clustering module 165 next embeds hard negative constraints in the affinity matrix A, by making $A_{ij}=0$ when $s_i$ and $s_j$ are known to belong to different clusters (represent different people) (S429). Clustering module 165 also embeds hard positive constraints in the affinity matrix A, by making $A_{ij}=1$ when hard positive constraints exist between $s_i$ and $s_j$ (S429, S471). An example of positive constraint is the constraint that a person appears in consecutive pictures. For example, if it is known that two person images $s_i$ and $s_j$ in two images belong to the same individual, the algorithm can enforce such positive constraints by setting the term $A_{ij}=1$ in the affinity matrix A, and the term $R_{ij}=0$ in the repulsion matrix R generated in step S431. Such a hard positive constraint may be available from users' feedback, when an indication is received from a user of the application pinpointing images in which a person appears.

Clustering module 165 also generates a repulsion matrix R to describe how dissimilar the two points $s_i$ and $s_j$ are (S431). To embed hard negative constraints, the term $R_{ij}$ is set to be 1 if $s_i$ and $s_j$ cannot be in the same cluster (represent different people) (S433). Clustering module 165 may embed hard positive constraints as well in the repulsion matrix R, if positive constraints are available (S471).

Clustering module 165 then generates be the diagonal matrix $D_R$ whose $i^{th}$ diagonal element is the sum of R's $i^{th}$ row (S435), and the diagonal matrix $D_A$ whose $i^{th}$ diagonal element is the sum of A's $i^{th}$ row (S437). Matrices $\hat{W}$ and $\hat{D}$ are defined as in equations (4) and (5), by $\hat{W}=A-R+D_R$ and $\hat{D}=D_A+D_R$ (S439). The L matrix is then defined as (S441):

$$L'=\hat{D}^{-1/2}\hat{W}\hat{D}^{-1/2} \tag{7}$$

Clustering module 165 then finds the K largest eigenvectors of L', and forms the matrix X by stacking these eigenvectors in columns (S443). The number K of different people in the image set is input into clustering module 165 (S473) before clustering module 165 selects the K largest eigenvectors. The number of different people in the image set is the number of clusters to be found. The number of different people, or clusters, in the image set may be determined in a number of ways. The number of different people in the image set can be manually input into clustering module 165 by a user using the user input unit 58. The number of different people in the image set can also be found as described at FIG. 6, using the eigenvalues of the matrix $L_0=D^{-1/2}AD^{-1/2}$ constructed as in FIG. 6. The number of different people (clusters) in the image set can also be found by selecting the number of clusters according to the sum of distances from points to their centers in constrained K-means clustering as described at FIG. 6.

Clustering module 165 then forms the matrix Y by re-normalizing each of X's rows to have unit length (S445). Treating each row of Y as a point, clustering module 165 clusters the rows of Y using constrained K-means clustering (S447). Additional positive and/or negative constraints may be received by clustering module 165 from user input 58 (S481). Constrained K-means clustering enforces the hard constraints. In each iteration of the constrained K-means algorithm, when a point is assigned to a cluster, two criteria are used: (1) distance to the center of the cluster; and (2) whether the hard constraint is satisfied. A point can be assigned to a cluster only when the hard constraint is not violated. Hence, each point is assigned to the closest cluster not violating the hard constraints. Therefore, the constrained K-means guarantees that the hard constraints are satisfied. Clustering module 165 may use other constrained clustering methods that use and respect constraints in step S447, instead of constrained K-means.

Clustering module 165 assigns each point $s_i$ to cluster j if the $i^{th}$ row of Y is assigned to cluster j (S450). Clustering module 165 then outputs K clusters for the images in the set of images, based on identities of people in images (S483). The user may review the clustering results and input additional new positive and/or negative constraints, such as the fact that a certain person appears in an image or not (S481). The additional new positive and/or negative constraints input are embedded in the affinity matrix A and the repulsion matrix R in steps S429 and S433. Clustering module 165 may then run constrained K-means clustering again, enforcing newly received constraints. The sequence of steps in FIG. 8 may be performed as many times as desired by the user, for a refinement of clustering results.

A justification for the use of K-means (with or without a repulsion matrix, constrained or not), and therefore the use of constrained K-means will be presented next. $X^*_{conti}$ is the matrix Y obtained in step S445 in FIG. 8, or in step S345 in FIG. 7 or step S311 in FIG. 6. Each row of $X^*_{conti}$ corresponds to a person image $s_r$, so each row of $X^*_{conti}$ is taken as a point and K-means or constrained K-means clustering is performed on the points. It is advantageous to perform K-means clustering on the rows of $X^*_{conti}$ at the discretization step, rather than on the original set of points $S=\{s_1, \ldots, s_N\}$. This is because K-means clustering can work on the rows of $X^*_{conti}$, as the spectral clustering steps performed to obtain $X^*_{conti}$ have possibly transformed non-convex clusters into convex clusters (when the original set of points $S=\{s_1, \ldots, s_N\}$ formed non-convex clusters).

K-means or constrained K-means clustering methods can achieve as good results as the best partition matrix $X^*_{discrete}$ minimizing $\|X_{discrete}-X^*_{conti}O\|^2$, where O is an orthonormal matrix. To prove that K-means clustering can achieve as good results as the best partition matrix $X^*_{discrete}$ minimizing $\|X_{discrete}-X^*_{conti}O\|^2$, propositions 1 and 2 are used. Proposition 1 states that for any orthonormal matrix O, row vectors of $X^*_{conti}O$ and $X^*_{conti}$ have the same K-mean clustering results under the following condition: if $c_l$ is the $l^{th}$ initial center for $X^*_{conti}$, then $c_lO$ is the $l^{th}$ initial center for $X^*_{conti}O$.

Proposition 2 states that: suppose $X^*_{discrete}$ and $O^*$ are the discrete partition matrix and rotation matrix minimizing $\|X_{discrete}-X^*_{conti}O\|^2$. If rows of K×K identity matrix $I_K$ are taken as cluster centers, then one iteration of K-means clustering on row vectors of $X^*_{conti}O^*$ achieves the same clustering results as what represented by partition matrix $X^*_{discrete}$. Further, if $\|X^*_{discrete}-X^*_{conti}O^*\|^2$ is small, then the cluster centers will not go far away from rows of $I_K$, and therefore the K-means clustering on rows of $X^*_{conti}O^*$ will converge to the same clustering results as $X^*_{discrete}$. From propositions 1 and 2, if $\|X^*_{discrete}-X^*_{conti}O^*\|^2$ is small, and rows of $(O^*)^{-1}$ are taken as initial cluster centers, then K-means clustering on $X^*_{conti}$ achieves the same results as $X^*_{discrete}$. Small $\|X^*_{discrete}-X^*_{conti}O^*\|^2$ means that the points actually form good clusters, otherwise no clustering algorithm can work well. A good approximation of $(O^*)^-$ can be found by finding orthogonal vectors among rows of $X^*_{conti}$. Therefore, since hard constraints can be enforced by constrained K-means, K-means is a better discretization method for incorporating hard constraints.

The current application describes a method and an apparatus using constrained spectral clustering. The method and apparatus use face information, clothes information, and other available context information (such as the fact that people in one picture should be different individuals) to perform recognition and classification. The method and apparatus presented in the current application achieve a number of results. The method and apparatus presented in the current application develop a spectral clustering algorithm utilizing context information, such as that persons from one picture should be in different clusters. The method and apparatus give results superior to traditional clustering algorithms. The method and apparatus presented in the current application are able to handle cases when face or clothes information is missing, by computing proper marginal probabilities. The method and apparatus in the current application are able to incorporate more context cues besides face and clothes information by using a repulsion matrix and the constrained K-means. For example, the method and apparatus are able to enforce hard negative constraints, such as the constraint that persons from one picture should be in different clusters. The method and apparatus in the current application are also able to handle cases when different people found in the same image wear the same (or similar) clothes.

Although the detailed embodiments described in the present application relate to human recognition and classification, principles of the present invention may also be applied to other types of objects appearing in digital images.

Although detailed embodiments and implementations of the present invention have been described above, it should be apparent that various modifications are possible without departing from the spirit and scope of the present invention.

We claim:

1. A digital image processing method for performing clustering of digital image data by utilizing one or more processors, said method comprising:
   accessing element data representing a plurality of elements belonging to a plurality of digital images;
   performing a similarity analysis between said elements from said plurality of elements to obtain inter-relational data results relating to said elements; and
   performing, using at least one processor, clustering of said plurality of elements, said step of performing clustering including
      incorporating in said inter-relational data results at least one hard constraint relating to elements from said plurality of elements, to obtain constrained inter-relational data results, performing a spectral analysis to obtain eigenvector results from said constrained inter-relational data results, and performing discretization of said eigenvector results using constrained clustering with a criterion to enforce said at least one hard constraint to obtain clusters.

2. The digital image processing method for performing clustering of digital image data by utilizing one or more processors as recited in claim 1, wherein said sub-step of performing discretization uses constrained K-means clustering.

3. The digital image processing method for performing clustering of digital image data by utilizing one or more processors as recited in claim 1, wherein said elements are people found in said plurality of digital images.

4. The digital image processing method for performing clustering of digital image data by utilizing one or more processors as recited in claim 3, wherein said at least one hard constraint includes a hard negative constraint that two people found in the same image from said plurality of digital images have different identities.

5. The digital image processing method for performing clustering of digital image data by utilizing one or more processors as recited in claim 3, wherein said at least one hard constraint includes a hard positive constraint based on predetermined knowledge that two people found in different images from said plurality of digital images are the same person.

6. The digital image processing method for performing clustering of digital image data by utilizing one or more processors as recited in claim 3, wherein said step of performing a similarity analysis between said elements includes performing a face similarity analysis between faces of said people to obtain face similarity measures between faces of said people, performing a clothes similarity analysis between clothes of said people to obtain clothes similarity measures between clothes of said people, and providing a plurality of formulas for estimating similarity measures for pairs of people from said plurality of digital images to represent the same person, based on availability of said face similarity measures and said clothes similarity measures.

7. The digital image processing method for performing clustering of digital image data by utilizing one or more processors as recited in claim 6, wherein said step of performing a similarity analysis between said elements selects at least one formula from said plurality of formulas based on a time when images from said plurality of digital images were taken, to obtain a similarity measure between two people for said inter-relational data results, selects at least one formula from said plurality of formulas based on a place where images from said plurality of digital images were taken, to obtain a similarity measure between two people for said inter-relational data results, selects at least one formula from said plurality of formulas based on whether more than one person is wearing the same clothes in a single image, to obtain a similarity measure between two people for said inter-relational data results, selects at least one formula from said plurality of formulas to obtain a similarity measure between two people for said inter-relational data results when only a face similarity measure from said face similarity measures but no clothes similarity measure from said clothes similarity measures is available, selects at least one formula from said plurality of formulas to obtain a similarity measure between two people for said inter-relational data results when only a clothes similarity measure from said clothes similarity measures but no face similarity measure from said face similarity measures is available, and selects at least one formula from said plurality of formulas to obtain a similarity measure between two people for said inter-relational data results when a face similarity measure from said face similarity measures and a clothes similarity measure from said clothes similarity measures are available.

8. The digital image processing method for performing clustering of digital image data by utilizing one or more processors as recited in claim 6, further comprising:

segmenting clothes to determine clothes areas in said plurality of digital images via maximizing a difference between neighboring clothes, and removing clutters from said clothes areas, before said step of performing a similarity analysis.

9. The digital image processing method for performing clustering of digital image data by utilizing one or more processors as recited in claim 8, wherein clothes in said plurality of digital images include at least one of clothing, shoes, watch, and eyeglasses.

10. The digital image processing method for performing clustering of digital image data by utilizing one or more processors as recited in claim 8, further comprising:

performing clothes feature extraction after said step of removing clutters and before said step of performing a similarity analysis, said step of performing clothes feature extraction including extracting representative image patches from said clothes areas, and generating feature vectors from frequencies of appearance of said representative image patches in said clothes areas, to obtain numerical representations for said clothes areas for use in said step of performing a similarity analysis between said elements.

11. The digital image processing method for performing clustering of digital image data by utilizing one or more processors as recited in claim 1, wherein number of said clusters is predetermined before said step of performing clustering of said plurality of elements.

12. The digital image processing method for performing clustering of digital image data by utilizing one or more processors as recited in claim 1, wherein said eigenvector results are a set of numerical elements, a one-to-one correspondence exists between elements from said plurality of elements and said numerical elements, and each element from plurality of elements is assigned to a cluster from said clusters to which a corresponding numerical element from said numerical elements was clustered in said sub-step of performing discretization.

13. The digital image processing method for performing clustering of digital image data by utilizing one or more processors as recited in claim 1, wherein said step of performing a similarity analysis includes obtaining similarity scores between said elements, and obtaining an affinity matrix A using said similarity scores;

said sub-step of incorporating includes incorporating in said affinity matrix A said at least one hard constraint, and using said affinity matrix A to obtain said constrained inter-relational data results in the form of an inter-relational data matrix L;

said sub-step of performing a spectral analysis includes
selecting a predetermined number of largest eigenvectors of said inter-relational data matrix L,
stacking selected eigenvectors into columns to obtain a matrix X, and
normalizing the rows of said matrix X to unit length to obtain said eigenvector results in the form of a matrix Y; and said sub-step of performing discretization includes
clustering rows of said matrix Y using constrained K-means clustering using a criterion to enforce said at least one hard constraint to obtain said clusters, and
assigning elements from said plurality of elements to clusters to which rows of said matrix Y associated with said elements are assigned.

14. The digital image processing method for performing clustering of digital image data by utilizing one or more processors as recited in claim 13, wherein
said elements are people found in said plurality of digital images,
said at least one hard constraint includes a negative constraint that two people found in the same image from said plurality of digital images have different identities, and
said step of performing a similarity analysis between said elements includes
performing a similarity analysis between faces of said people to obtain face similarity scores between faces of said people,
performing a similarity analysis between clothes of said people to obtain clothes similarity scores between clothes of said people,
combining said face similarity scores and said clothes similarity scores for pairs of people, to obtain said similarity scores, and
obtaining said affinity matrix A using said similarity scores for said pairs of people.

15. A digital image processing method for performing clustering of digital image data by utilizing one or more processors, said method comprising:
accessing element data representing a plurality of elements belonging to a plurality of digital images;
performing a similarity analysis between said elements from said plurality of elements to obtain inter-relational data results relating to said elements; and
performing, using at least one processor, clustering of said plurality of elements, said step of performing clustering including
incorporating in said inter-relational data results at least one hard negative constraint relating to dissimilarities between said elements, to obtain constrained inter-relational data results,
performing a spectral analysis to obtain eigenvector results from said constrained inter-relational data results, and
performing discretization of said eigenvector results by clustering said eigenvector results to obtain clusters, wherein clustering is performed to enforce said hard constraint.

16. The digital image processing method for performing clustering of digital image data by utilizing one or more processors as recited in claim 15, wherein said sub-step of performing discretization uses K-means clustering to cluster said eigenvector results to obtain said clusters.

17. The digital image processing method for performing clustering of digital image data by utilizing one or more processors as recited in claim 16, wherein
said elements are people found in said plurality of digital images, and
said at least one hard negative constraint includes a negative constraint that two people found in the same image from said plurality of digital images have different identities.

18. The digital image processing method for performing clustering of digital image data by utilizing one or more processors as recited in claim 17, wherein said step of performing a similarity analysis between said elements includes
performing a face similarity analysis between faces of said people to obtain face similarity measures between faces of said people,
performing a clothes similarity analysis between clothes of said people to obtain clothes similarity measures between clothes of said people, and
providing a plurality of formulas for estimating similarity measures for pairs of people from said plurality of digital images to represent the same person, based on availability of said face similarity measures and said clothes similarity measures.

19. The digital image processing method for performing clustering of digital image data by utilizing one or more processors as recited in claim 17, further comprising:
segmenting clothes to determine clothes areas in said plurality of digital images via maximizing a difference between neighboring clothes,
removing clutters from said clothes areas, before said step of performing a similarity analysis, and
performing clothes feature extraction before said step of performing a similarity analysis, said step of performing clothes feature extraction including
extracting representative image patches from said clothes areas, and
generating feature vectors from frequencies of appearance of said representative image patches in said clothes areas, to obtain numerical representations for said clothes areas for use in said step of performing a similarity analysis between said elements.

20. The digital image processing method for performing clustering of digital image data by utilizing one or more processors as recited in claim 15, wherein
said step of performing a similarity analysis includes
obtaining similarity scores between said elements, and
obtaining an affinity matrix A using said similarity scores;
said sub-step of incorporating includes
incorporating in said affinity matrix A said at least one hard negative constraint,
generating a repulsion matrix R using said at least one hard negative constraint, and
using said affinity matrix A and said repulsion matrix R to obtain said constrained inter-relational data results in the form of an inter-relational data matrix L;
said sub-step of performing a spectral analysis includes
selecting a predetermined number of largest eigenvectors of said inter-relational data matrix L,
stacking selected eigenvectors into columns to obtain a matrix X, and
normalizing the rows of said matrix X to unit length to obtain said eigenvector results in the form of a matrix Y; and said sub-step of performing discretization includes
clustering rows of said matrix Y using K-means clustering to obtain said clusters, and
assigning elements from said plurality of elements to clusters to which rows of said matrix Y associated with said elements are assigned.

21. A digital image processing apparatus, said apparatus comprising:
an image data unit for providing element data representing a plurality of elements belonging to a plurality of digital images;
a similarity analysis unit for performing a similarity analysis between said elements from said plurality of elements to obtain inter-relational data results relating to said elements; and
a clustering unit for performing clustering of said plurality of elements, said clustering unit performing clustering by
incorporating in said inter-relational data results at least one hard constraint relating to elements from said plurality of elements, to obtain constrained inter-relational data results,
performing a spectral analysis to obtain eigenvector results from said constrained inter-relational data results, and
performing discretization of said eigenvector results using constrained clustering with a criterion to enforce said at least one hard constraint to obtain clusters.

22. The apparatus according to claim 21, wherein said clustering unit performs discretization using constrained K-means clustering.

23. The apparatus according to claim 21, wherein said elements are people found in said plurality of digital images.

24. The apparatus according to claim 23, wherein said at least one hard constraint includes a hard negative constraint that two people found in the same image from said plurality of digital images have different identities.

25. The apparatus according to claim 23, wherein said at least one hard constraint includes a hard positive constraint based on predetermined knowledge that two people found in different images from said plurality of digital images are the same person.

26. The apparatus according to claim 23, wherein said similarity analysis unit comprises:
a face unit for performing a face similarity analysis between faces of said people to obtain face similarity measures between faces of said people,
a clothes unit for performing a clothes similarity analysis between clothes of said people to obtain clothes similarity measures between clothes of said people, and
a combination unit for providing a plurality of formulas for estimating similarity measures for pairs of people from said plurality of digital images to represent the same person, based on availability of said face similarity measures and said clothes similarity measures.

27. The apparatus according to claim 26, wherein said combination unit
selects at least one formula from said plurality of formulas based on a time when images from said plurality of digital images were taken, to obtain a similarity measure between two people for said inter-relational data results,
selects at least one formula from said plurality of formulas based on a place where images from said plurality of digital images were taken, to obtain a similarity measure between two people for said inter-relational data results,
selects at least one formula from said plurality of formulas based on whether more than one person is wearing the same clothes in a single image, to obtain a similarity measure between two people for said inter-relational data results,
selects at least one formula from said plurality of formulas to obtain a similarity measure between two people for said inter-relational data results when only a face similarity measure from said face similarity measures but no clothes similarity measure from said clothes similarity measures is available,
selects at least one formula from said plurality of formulas to obtain a similarity measure between two people for said inter-relational data results when only a clothes similarity measure from said clothes similarity measures but no face similarity measure from said face similarity measures is available, and
selects at least one formula from said plurality of formulas to obtain a similarity measure between two people for said inter-relational data results when a face similarity measure from said face similarity measures and a clothes similarity measure from said clothes similarity measures are available.

28. The apparatus according to claim 26, further comprising:
a clothes segmentation unit for determining clothes areas in said plurality of digital images via maximizing a difference between neighboring clothes, and removing clutters from said clothes areas, before said similarity analysis unit performs said similarity analysis.

29. The apparatus according to claim 28, wherein clothes in said plurality of digital images include at least one of clothing, shoes, watch, and eyeglasses.

30. The apparatus according to claim 28, further comprising:
a clothes representation unit for performing clothes feature extraction on said clothes areas by
extracting representative image patches from said clothes areas,
generating feature vectors from frequencies of appearance of said representative image patches in said clothes areas to obtain numerical representations for said clothes areas, and
sending said numerical representations for said clothes areas to said clothes unit.

31. The apparatus according to claim 21, wherein number of said clusters is predetermined before said clustering unit performs clustering of said plurality of elements.

32. The apparatus according to claim 21, wherein
said eigenvector results are a set of numerical elements,
a one-to-one correspondence exists between elements from said plurality of elements and said numerical elements, and
said clustering unit assigns each element from said plurality of elements to a cluster from said clusters to which a corresponding numerical element from said numerical elements was clustered.

33. The apparatus according to claim 21, wherein
said similarity analysis unit performs a similarity analysis between said elements by
obtaining similarity scores between said elements, and
obtaining an affinity matrix A using said similarity scores; and
said clustering unit performs clustering of said plurality of elements by
incorporating in said affinity matrix A said at least one hard constraint, using said affinity matrix A to obtain said constrained inter-relational data results in the form of an inter-relational data matrix L, selecting a predetermined number of largest eigenvectors of said inter-relational data matrix L, stacking selected eigenvectors into columns to obtain a matrix X, normalizing the rows of said matrix X to unit length to obtain said eigenvector results in the form of a matrix Y, clustering rows of said matrix Y using constrained K-means clustering using a criterion to enforce said at least one hard constraint to obtain said clusters, and assigning elements from said plurality of elements to clusters to which rows of said matrix Y associated with said elements are assigned.

34. The apparatus according to claim 33, wherein said elements are people found in said plurality of digital images, said at least one hard constraint includes a hard negative constraint that two people found in the same image from said plurality of digital images have different identities, and said similarity analysis unit performs said similarity analysis between said elements by performing a similarity analysis between faces of said people to obtain face similarity scores between faces of said people, performing a similarity analysis between clothes of said people to obtain clothes similarity scores between clothes of said people, combining said face similarity scores and said clothes similarity scores for pairs of people, to obtain said similarity scores, and obtaining said affinity matrix A using said similarity scores for said pairs of people.

35. A digital image processing apparatus, said apparatus comprising:

an image data unit for providing element data representing a plurality of elements belonging to a plurality of digital images;

a similarity analysis unit for performing a similarity analysis between said elements from said plurality of elements to obtain inter-relational data results relating to said elements; and a clustering unit for performing clustering of said plurality of elements, said clustering unit performing clustering by incorporating in said inter-relational data results at least one hard negative constraint relating to dissimilarities between said elements, to obtain constrained inter-relational data results, performing a spectral analysis to obtain eigenvector results from said constrained inter-relational data results, and performing discretization of said eigenvector results by clustering said eigenvector results to obtain clusters, wherein clustering is performed to enforce said hard constraint.

36. The apparatus according to claim 35, wherein said clustering unit uses K-means clustering to cluster said eigenvector results to obtain said clusters.

37. The apparatus according to claim 36, wherein said elements are people found in said plurality of digital images, and said at least one hard negative constraint includes a negative constraint that two people found in the same image from said plurality of digital images have different identities.

38. The apparatus according to claim 37, wherein said similarity analysis unit comprises:

a face unit for performing a face similarity analysis between faces of said people to obtain face similarity measures between faces of said people, a clothes unit for performing a clothes similarity analysis between clothes of said people to obtain clothes similarity measures between clothes of said people, and a combination unit for providing a plurality of formulas for estimating similarity measures for pairs of people from said plurality of digital images to represent the same person, based on availability of said face similarity measures and said clothes similarity measures.

39. The apparatus according to claim 37, further comprising:

a clothes segmentation unit for determining clothes areas in said plurality of digital images via maximizing a difference between neighboring clothes, and removing clutters from said clothes areas, and a clothes representation unit for performing clothes feature extraction on said clothes areas by extracting representative image patches from said clothes areas, generating feature vectors from frequencies of appearance of said representative image patches in said clothes areas to obtain numerical representations for said clothes areas, and sending said numerical representations for said clothes areas to said similarity analysis unit.

40. The apparatus according to claim 35, wherein said similarity analysis unit performs a similarity analysis between said elements by obtaining similarity scores between said elements, and obtaining an affinity matrix A using said similarity scores; and said clustering unit performs clustering of said plurality of elements by incorporating in said affinity matrix A said at least one hard negative constraint, generating a repulsion matrix R using said at least one hard negative constraint, using said affinity matrix A and said repulsion matrix R to obtain said constrained inter-relational data results in the form of an inter-relational data matrix L, selecting a predetermined number of largest eigenvectors of said inter-relational data matrix L, stacking selected eigenvectors into columns to obtain a matrix X, normalizing the rows of said matrix X to unit length to obtain said eigenvector results in the form of a matrix Y, clustering rows of said matrix Y using K-means clustering to obtain said clusters, and assigning elements from said plurality of elements to clusters to which rows of said matrix Y associated with said elements are assigned.

* * * * *